Nov. 27, 1934.  A. D. WISEMAN  1,982,336
DENTAL TOOL
Filed Dec. 27, 1932
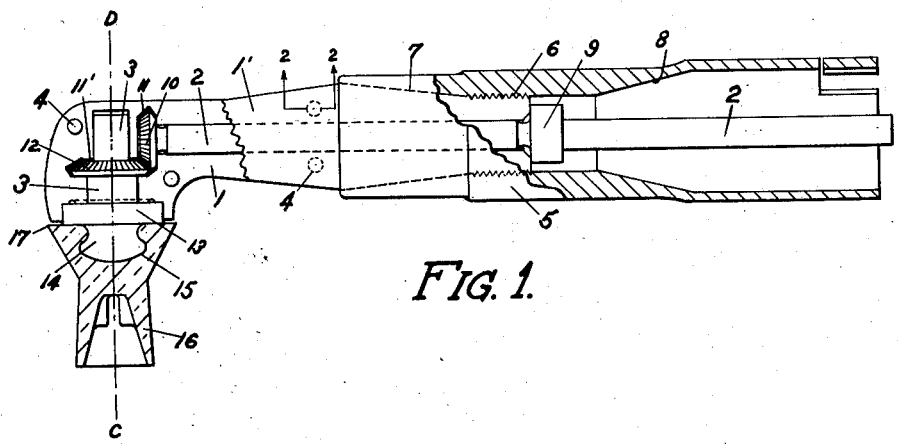
FIG. 1.
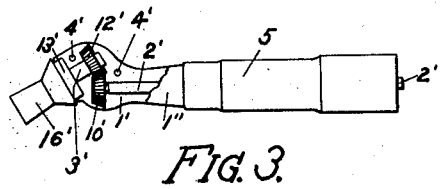
FIG. 3.
FIG. 2.
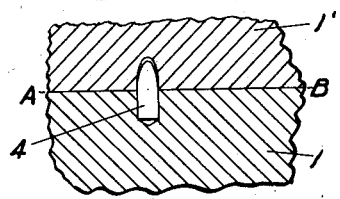
INVENTOR.
ADOLPH D. WISEMAN.
BY Miller Boyken & Bried
ATTORNEYS.

Patented Nov. 27, 1934

1,982,336

UNITED STATES PATENT OFFICE 1,982,336

DENTAL TOOL

Adolph D. Wiseman, San Francisco, Calif.

Application December 27, 1932, Serial No. 648,835

1 Claim. (Cl. 32—27)

This invention relates to dental tools and in particular to a hand piece to hold polishing disks and "points". The objects of the invention are to provide an improved and more sanitary hand piece for use on the operating shaft of a dental engine and to receive detachable rubber polishing disks or cups of the kind shown in my copending patent application filed under Serial No. 620,772. One of the specific objects of the invention is a split construction of the hand piece whereby the gears may be greased or easily taken out. Another object is the provision of means to prevent ingress of polishing powder to the gears or leakage of grease. Other features and advantages will appear in the following description and accompanying drawing.

In the drawing Fig. 1 is a sectional view of the hand piece enlarged about two diameters. Fig. 2 is a section in the opposite plane of a portion of Fig. 1 taken along the line 2—2 thereof, and slightly enlarged.

Fig. 3 is a substantially full size view of a similar hand piece partly broken away with a lesser tool angle.

In further detail, the hand piece comprises a body portion round in cross section and divided along its medial line A—B so as to form two halves 1 and 1'. These halves are preferably of steel milled out to form complementary recesses to receive the gears and shafts constituting the tool drive. In Fig. 1 the body is L shape and the shafts are shown at 2 and 3 lying in semi-circular milled channels of a depth equal to half of the diameters of the shafts so that when the other half 1' of the body is juxtapositioned the shafts will be revolvably confined.

The two halves of the body fit perfectly together with a plain but grease-tight joint along the medial line and are preferably aligned by small pins 4 which are fitted tightly in body half 1 and are tapered on their outer ends to fit nicely into tapered holes formed in the opposite body half.

The two halves of the body after centering by the pins as described, are then locked together by means of a ferrule or tubular member 5 which is threaded to the body member at 6 and formed with a long tapered throat 7 which fits over a long tapered portion formed on the body members, all in a manner so that upon screwing the ferrule tightly in place it will compress the tapered walls of the body member and thus clamp the two halves together. The portion of the ferrule extending beyond the body is tapered outwardly at 8 to provide means for forcing the jaws of a driving clutch (not shown) against the extension of shaft 2 in a manner well known in the art.

Shaft 2 has a collar at 9 and a bevel gear 10 at its inner end, both preferably formed integral with the shaft. Gear 10 operates in an opening 11 milled for it out of the body, and as collar 9 is at the extreme end of the body no longitudinal movement can take place.

Shaft 3 is turned from solid stock to form a bevel gear 12, a disk 13, and a rounded knob or button 14 projecting from the outer side of the disk to fit tightly into a complementarily shaped socket 15 of a soft resilient rubbber polishing cup or disk 16 which, when in place, seats snugly against the outer surface of the disk as shown in Fig. 1 and just clears the metal of the body and overhangs it slightly, terminating in a sharp edge 17 to throw the saliva outwardly when rotating.

Disk 13 is recessed into the end of the body with a close revolvable fit so that foreign matter cannot get in, and the shaft 3' between the disk 13 and gear 12 is somewhat larger than the portion 3 beyond the gear. Gear 12 is in mesh with gear 10 and like it operates in a semi-circular opening or well 11' which communicates with well 11 and is free enough to hold a small quantity of grease for the gears. Other small clearances are shown to accommodate a small surplusage of grease so that when the halves of the body are locked together over the shafts they will be lubricated for a long time yet no grease can escape as there are no open oil holes or places to inject oil as in all previous tools of this kind.

The chief feature of importance in my improved construction is the formation of the button 14 as an integral part of the short shaft and gear combination with a head ⅔ or ½ the length (measured on the line C—D) of any prior tool, as heretofore the cleaning disk shaft had to extend clear through the head and lock on the upper side against pulling out, whereas with the present construction, once the polishing disk shaft is dropped into place it is locked against any longitudinal movement by disk 13 and gear 12.

To change or apply new rubber polishing cups 16, they are forcibly removed or sprung over the button 14 and being a tight resilient fit they never slip in use. The cups themselves are the subject of claims in any copending patent application above mentioned.

In Fig. 3 the elements are the same as above described except that the gears are slightly changed in position so as to provide for a lesser angle to the polishing cup shaft than the showing of Fig. 1 which is shown with polishing shaft at right angles to the drive shaft 2 of the hand piece. The same numerals have been used to designate the parts of Fig. 3 except that they have been primed in addition.

The tool as shown connects to the driving shaft or so-called Doriot hand piece of the ordinary dental engine, as well understood in the art.

Having thus described my improvements, what I claim is:

A dental hand piece comprising a split body, each half of said body having half bearings formed therein arranged and adapted to coact to form bearings for a driven and a driving shaft when the halves of the body are together, a driven and a driving shaft rotatably mounted in said bearings, said driven shaft being provided with a driven gear spaced from its opposite ends and a driving gear on the inner end of the driving shaft in mesh therewith, one end of said driven shaft projecting outwardly of a side of the body and terminating at its outer end in a knob for receiving a cleaning and polishing member, the half bearings for said driven shaft being in two pairs disposed respectively on opposite sides of said driven gear and the body being formed to close grease-tight over the inner end of the driven shaft, a disk on the driven shaft at the base of said knob arranged and adapted to coact with the pair of half bearings adjacent thereto and the driven gear for preventing longitudinal movement of the driven shaft when the halves of the body are locked together and means for locking the halves of the body together.

ADOLPH D. WISEMAN.